United States Patent [19]
Sugawa

[11] Patent Number: 5,138,674
[45] Date of Patent: Aug. 11, 1992

[54] IMAGE READER CAPABLE OF DETECTING BLANK DOCUMENTS

[75] Inventor: Hiroya Sugawa, Osaka, Japan

[73] Assignee: Minolta Camera Kabushiki Kaisha, Osaka, Japan

[21] Appl. No.: 662,110

[22] Filed: Feb. 26, 1991

Related U.S. Application Data

[63] Continuation of Ser. No. 268,218, Nov. 7, 1988, abandoned.

[30] Foreign Application Priority Data

Nov. 7, 1987 [JP] Japan .................... 62-281847

[51] Int. Cl.$^5$ .................... G06K 7/00; G06K 9/20
[52] U.S. Cl. .................... 382/58; 382/51; 382/56; 382/63; 358/464
[58] Field of Search .................... 382/54, 51, 58, 56, 382/57, 63, 62; 358/464, 486, 443, 448, 494; 355/23, 24

[56] References Cited

U.S. PATENT DOCUMENTS

| | | | |
|---|---|---|---|
| 3,305,833 | 2/1967 | Gallien | 382/57 |
| 4,464,682 | 8/1984 | Etoh et al. | 358/486 |
| 4,672,461 | 6/1987 | Yoshida | 358/280 |
| 4,763,200 | 8/1988 | Nakatani et al. | 358/282 |
| 4,839,740 | 6/1989 | Yoshida | 358/486 |
| 4,899,394 | 2/1990 | Lee | 382/9 |

Primary Examiner—Michael Razavi
Attorney, Agent, or Firm—Price, Gess & Ubell

[57] ABSTRACT

An image reader having blank document detection circuitry for detecting whether the document is blank or not, the detection circuitry comparing the data to a predetermined threshold value by picture elements, counting the number of the data over the predetermined threshold value, and detecting the blank document when the counted number does not exceed a preset number. The control circuitry can discontinue the later image reading operation in response to the detection of the blank document.

10 Claims, 12 Drawing Sheets

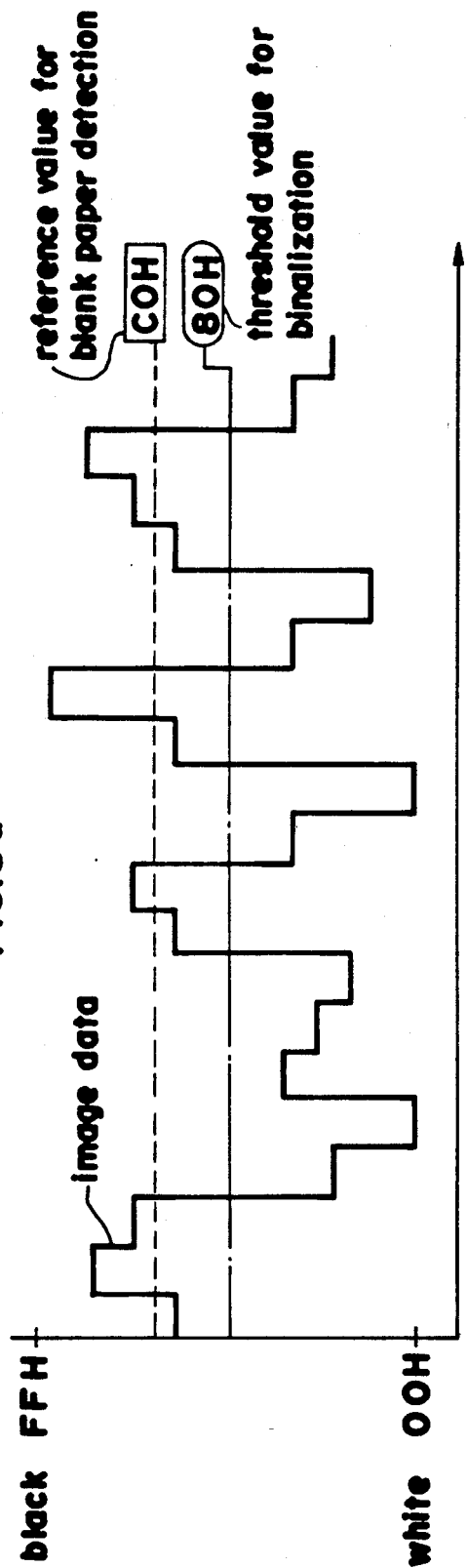

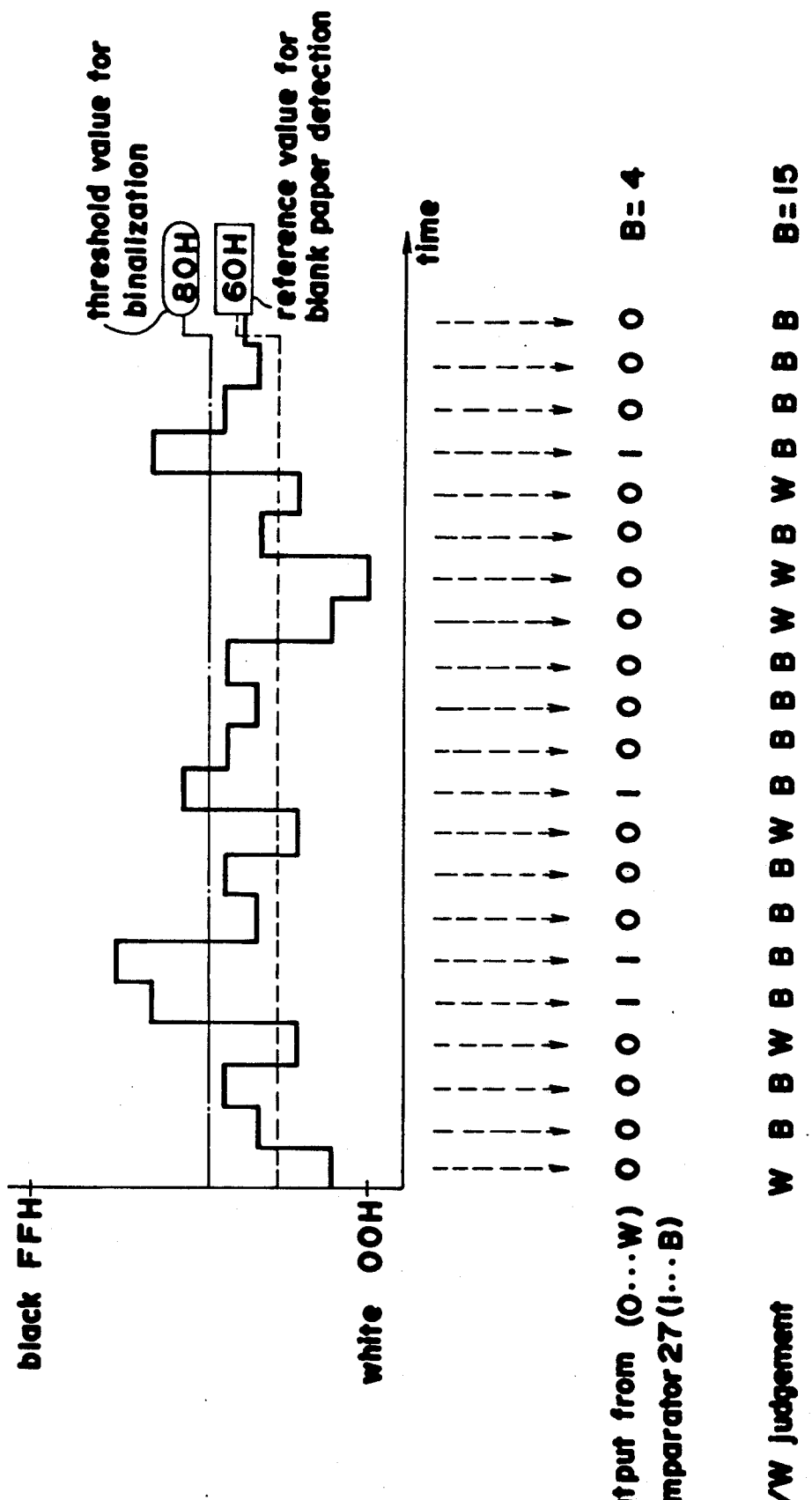

IMAGE READER CAPABLE OF DETECTING BLANK DOCUMENTS

This is a continuation of application Ser. No. 268,218, filed on Nov. 7, 1988, for an IMAGE READER CAPABLE OF DETECTING BLANK DOCUMENTS, and now abandoned.

FIELD OF THE INVENTION

The present invention relates to an image reader, and more particularly to an image reader capable of detecting blank documents.

BACKGROUND OF THE INVENTION

An image reader is a device for scanning characters, patterns or the like on an original document by an image sensor, converting its optical image into an electrical signal and outputting said electrical signal.

Conventional image readers cannot determine whether an original document has an image thereon. Therefore, image readers, when given a blank document or the reverse face of the document, only output electrical signals representing all most white picture elements.

Image readers are used in a word processing system or filing system as connected to a memory device, printer or the like. When a blank document is included in original documents, the image readers used in the aforesaid system reads the blank document to write its data in the memory device, e.g., an optical disc, thereby causing uneconomical use of the memory. Further, it is uneconomical for the circuit and the recording paper that the image readers serving as a facsimile in combination with a printer and sending/ receiving unit read a blank document to send its data.

SUMMARY OF THE INVENTION

A main object of the present invention is to provide an image reader capable of determining whether a document to be read has an image thereon.

Another object of the present invention is to provide an image reader which provides a warning of the result of a detection that a document to be read contains no image.

These and other objects of the invention can be accomplished by providing an image reader which comprises a blank judging means for comparing the data read by an image sensor to a predetermined threshold value and determining that a document is blank when the number of data indicating black does not exceed the preset number. The image reader gives a warning and discontinues the later image reading operation in response to the detection of a blank document.

These and other objects or features of the present invention will become apparent from the following description of the preferred embodiments thereof taken in conjunction with the accompanying drawings.

BRIEF DESCRIPTION OF THE DRAWINGS

In the following description, like parts are designated by like reference numbers throughout the several drawings.

FIGS. 8a and 8b are explanatory diagrams showing the determination of a blank document and binalization.

DETAILED DESCRIPTION OF THE PREFERRED EMBODIMENTS

Figure 1:
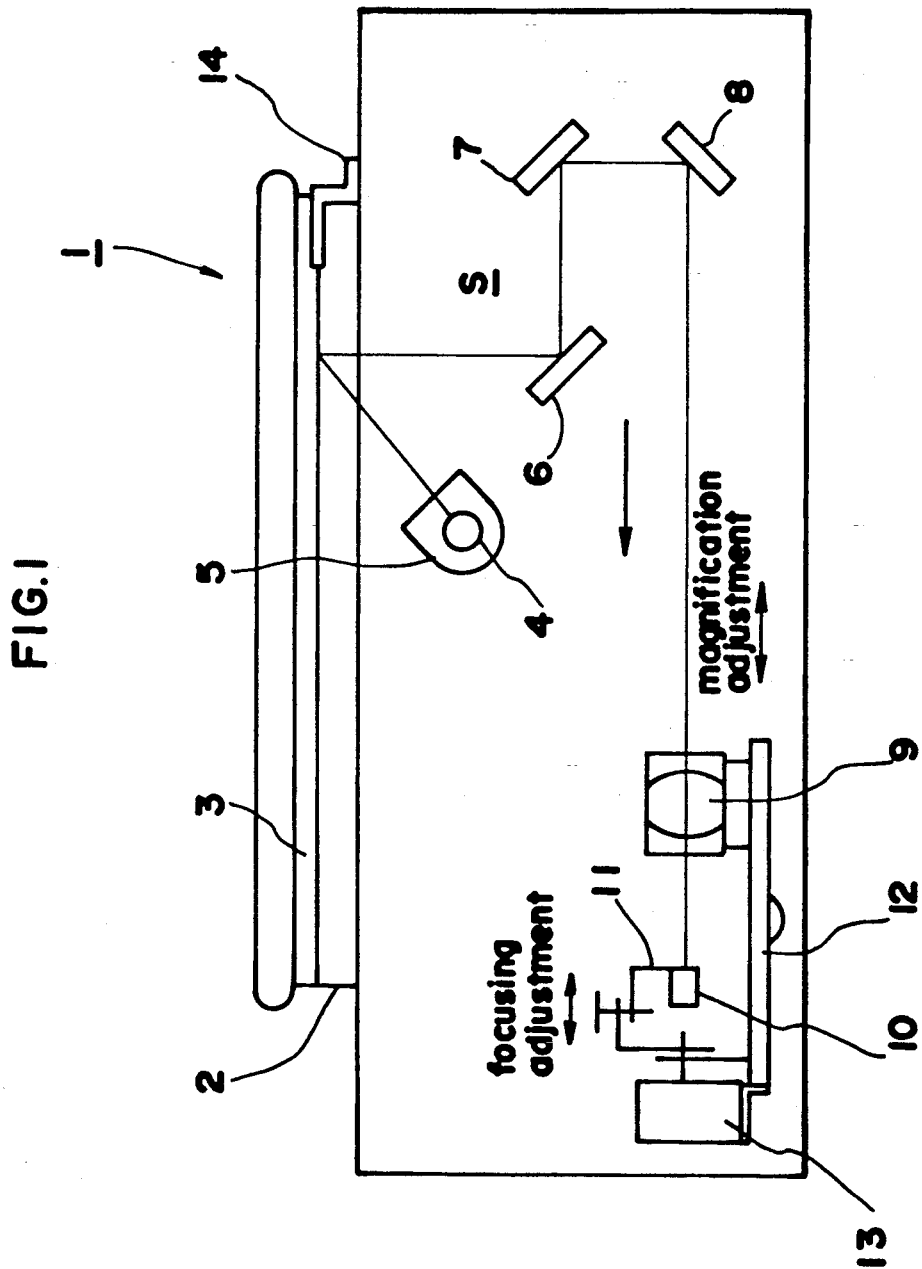
FIG. 1 is a sectional view schematically showing an image reader of the present invention.

FIG. 1 is a schematic view showing the construction of an image reader 1.

Numeral 2 designates a document support table for placing a document thereon, over which a document cover 3 is openably provided. The document placed on the document support table 2 is irradiated by a lamp 4 with a reflection mirror 5. Then, the reflected light is guided to a lens 9 via scanning mirrors 6, 7 and 8 to focus an image on an exact focusing position at an image sensor 10 composed of a CCD array. The lamp 4, reflection mirror 5 and scanning mirrors 6, 7 and 8 form a scanning system S and move in the subscanning direction as shown by an arrow in FIG. 1 to read the entire document. In this case, the lamp 4 and the scanning mirror 6 travel at a velocity of V, while the scanning mirrors 7 and 8 at a velocity of ($\frac{1}{2}$)V in order to keep the length of the optical path constant. The electrical scan of the image sensor 10 provides an image in the main scanning direction perpendicular to the subscanning direction. The image sensor 10 is supported by a support portion 11 so as to be adjustable in its position and angle. The support portion 11 and the lens 9 are mounted to a movable carriage 12.

The magnification can be altered by moving the movable carriage 12 in the direction of an optical axis by an unillustrated mechanism.

A focusing motor 13 shifts the support portion 11 in the direction of the optical axis upon the application of a power source to position the image sensor 10 at an exact focusing position against the lens 9, thereby achieving the focusing adjustment. More specifically, the image sensor 10 reads a focusing adjustment pattern formed on the reverse face of a document scale 14 fixed to the end of the document support table 2. Thereafter, a central processing unit (hereinafter referred to as CPU) 21 analyzes the data and rotates the focusing motor 13 so as to position the image sensor 10 in an appropriate focusing position.

The document scale 14 indicates where the document should be placed on the document support table 2 and has a magnification detecting pattern and a shading correction pattern formed on a reverse face thereof in addition to the focusing adjustment pattern.

Figure 2:
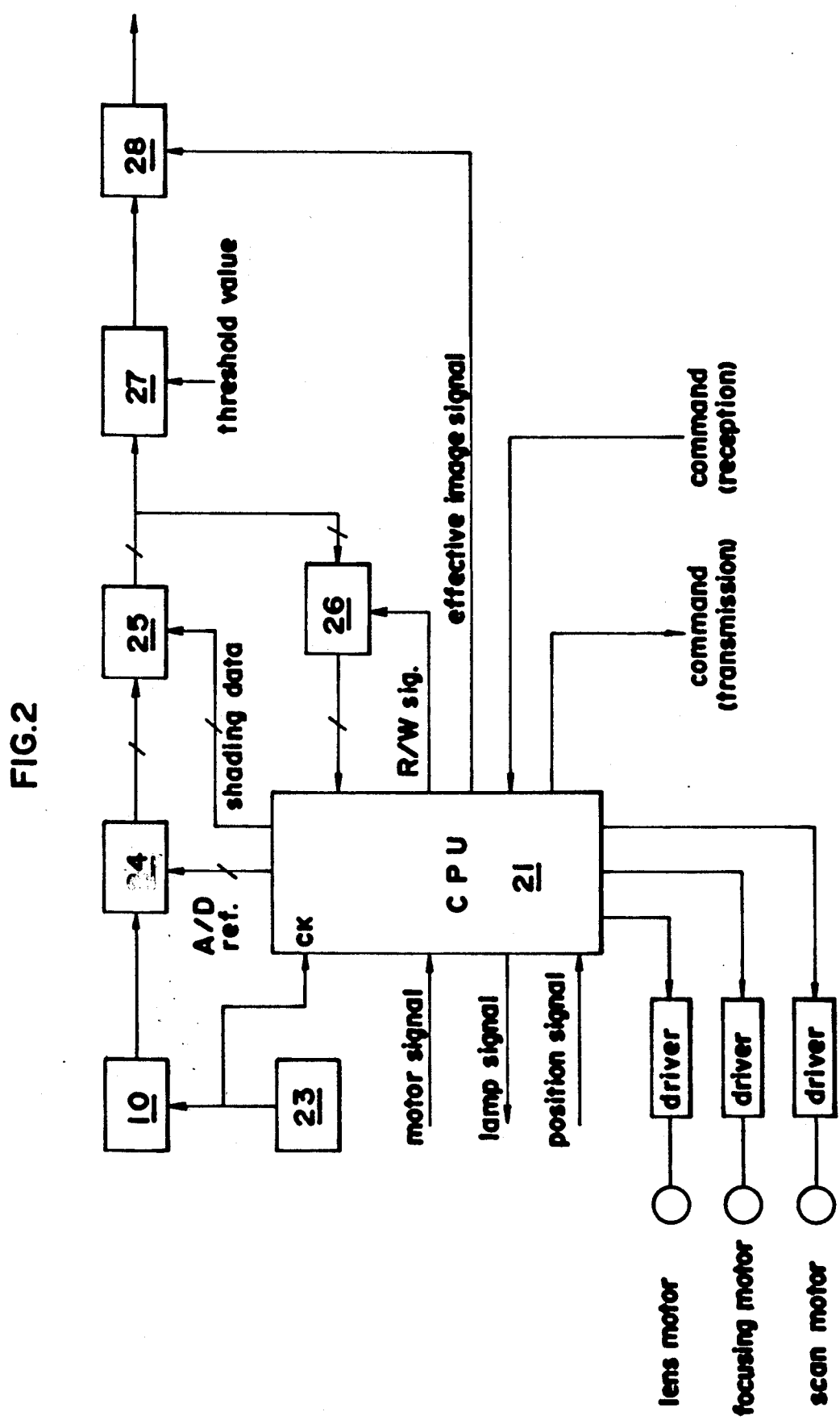
FIG. 2 is a block diagram showing an electrical construction of the image reader.

FIG. 2 is a block diagram of the image reader 1.

A clock generator 23 which gives a sample hold signal (hereinafter referred to as SH signal) to the image sensor 10 is connected to the CPU 21 for supplying a clock signal thereto. The image sensor 10 converts the image data (amount of light) into a voltage according to the clock signal and outputs said voltage. The output voltage of the image sensor 10 is converted into a digital value by an A/D converter 24 to be delivered to a shading circuitry 25. The shading circuitry 25 is provided for electrically correcting the irregularities of the intensity of light in the main scanning direction as well as the scattering in sensitivity among each bit of the image sensor 10. For this correction, the CPU 21 reads the shading correction pattern formed on the reverse face of the document scale 14 to give shading data to the shading circuitry 25, said data being then calculated by the CPU 21. The output from the shading circuitry 25 is fed to a comparator 27 and a line RAM 26.

The comparator 27 compares the data corrected by the shading circuitry 25 with a threshold value for binalization which is input to the comparator to thereby output the resultant 1-bit signal, i.e., "0" (white) or "1" (black). The resultant 1-bit output signal is then supplied to an output portion 28 where the binary data is output to an exterior device in accordance with an effective image signal from the CPU 21.

A line RAM 26 stores the data of a single scan-line in the main scanning direction which have been corrected by the shading circuitry 25.

The CPU 21 sends out a R/W signal to control whether the data should be written to or read from the line RAM 26. The CPU 21 reads the data written in the line RAM 26, whereby the fluctuation in the intensity of light received by the image sensor 10 can be recognized.

In addition to the above operation, the CPU 21 has input and output terminals of command signals which receives from or sends to a host device such as a computer various command signals such as a scan command, mode command or the like, signal output terminal for driving a lens motor, focusing motor and scanning motor, motor signal input terminal for inputting the number of rotation of motors, home position signal input terminal for receiving the output of a sensor which detects the position of the scanning system S, lamp signal output terminal for controlling the on/off of the lamp, effective image signal output terminal for controlling the output of the image data, or the like.

The mechanical and electrical construction of the aforesaid image reader is explained in detail in U.S. Pat. No. 4,751,376.

Subsequently, the image reading operation and the blank document detecting operation will be explained hereinbelow with reference to the flow charts.

Figure 3:
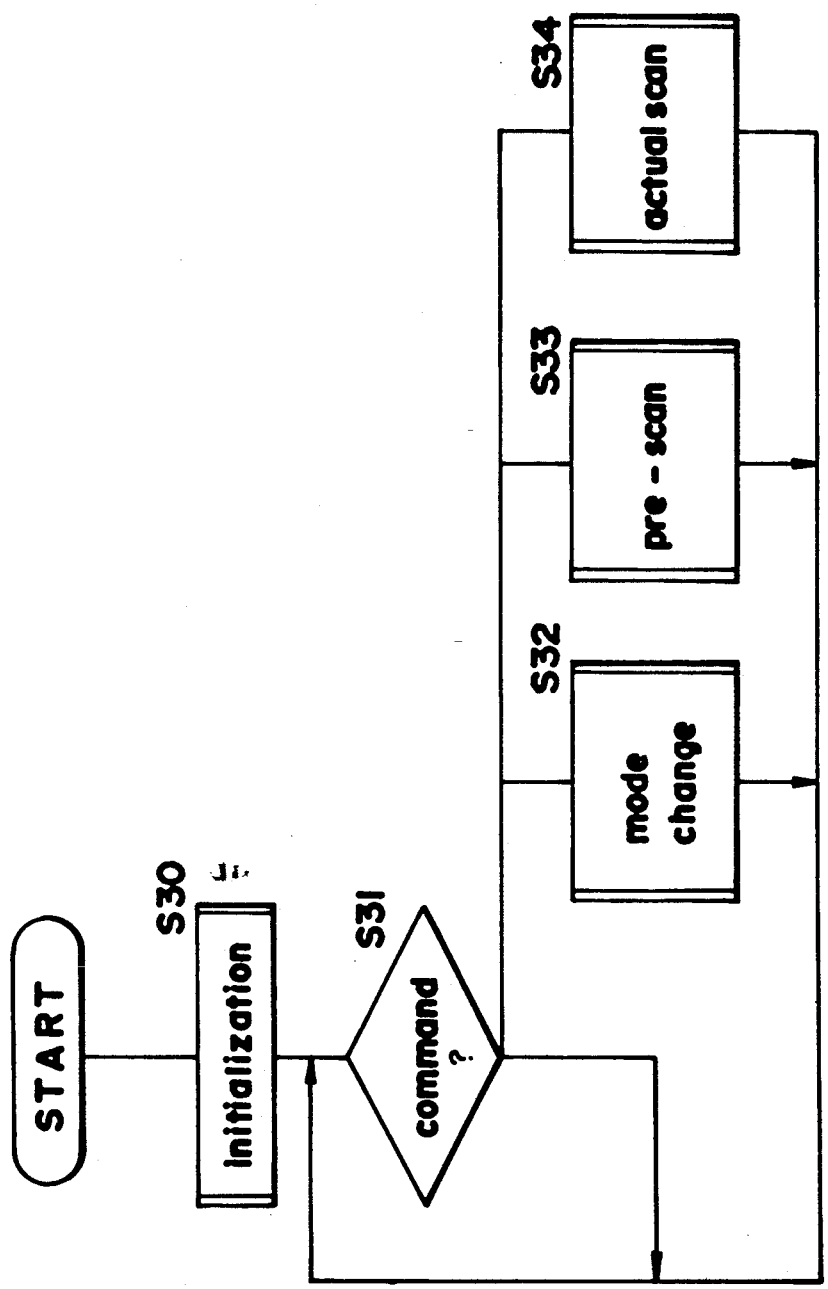
FIG. 3 is a flow chart showing a main routine for the control of the image reader.

FIG. 3 is a flow chart showing a main routine of the present embodiment.

Step S30 performs an initialization of conditions required for the focusing adjustment, magnification adjustment or the like after the power source is turned on. The subsequent step S31 determines which command is input from the host device, whereby the mode change, image reading operation by the prescan and image reading operation by the actual scan are executed respectively at steps S32, S33 and S34 according to the command of step S31. The sequence waits for the input of command if no command is input.

Figure 4:
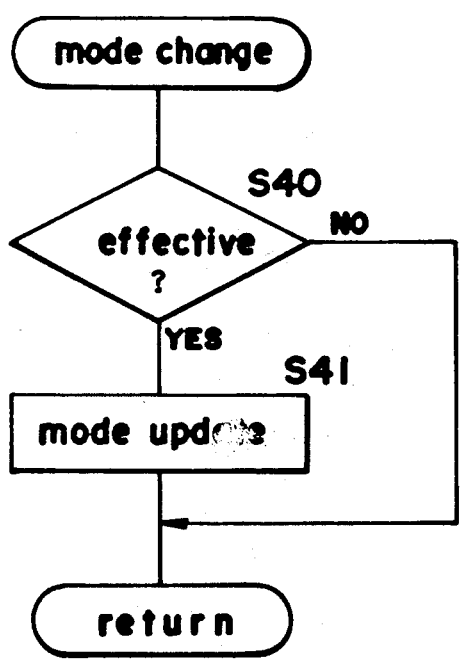
FIG. 4 is a flow chart showing a subroutine for the mode change.

FIG. 4 is a flow chart showing a subroutine of the mode change at step S32 in FIG. 3.

Step S40 judges as to whether the mode (for example, image reading size, image reading magnification, exposure level and the like) instructed from the host device is effective. If it is effective, i.e., "Yes" at step S40, the following step S41 performs the setting such as a magnification change due to the movement of the lens based on the mode change, to thereby renew the mode.

Figure 5A:
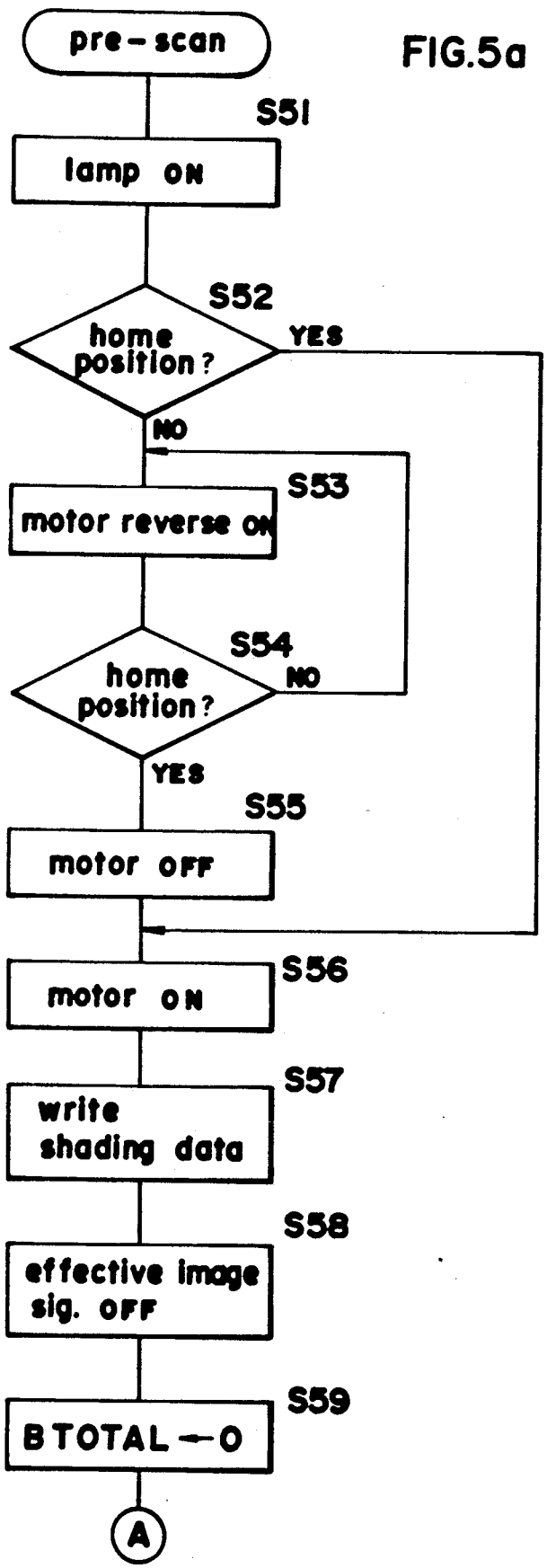
FIGS. 5a, 5b and 5c are flow charts showing a subroutine for an image reading operation by a prescan.
Figure 5B:
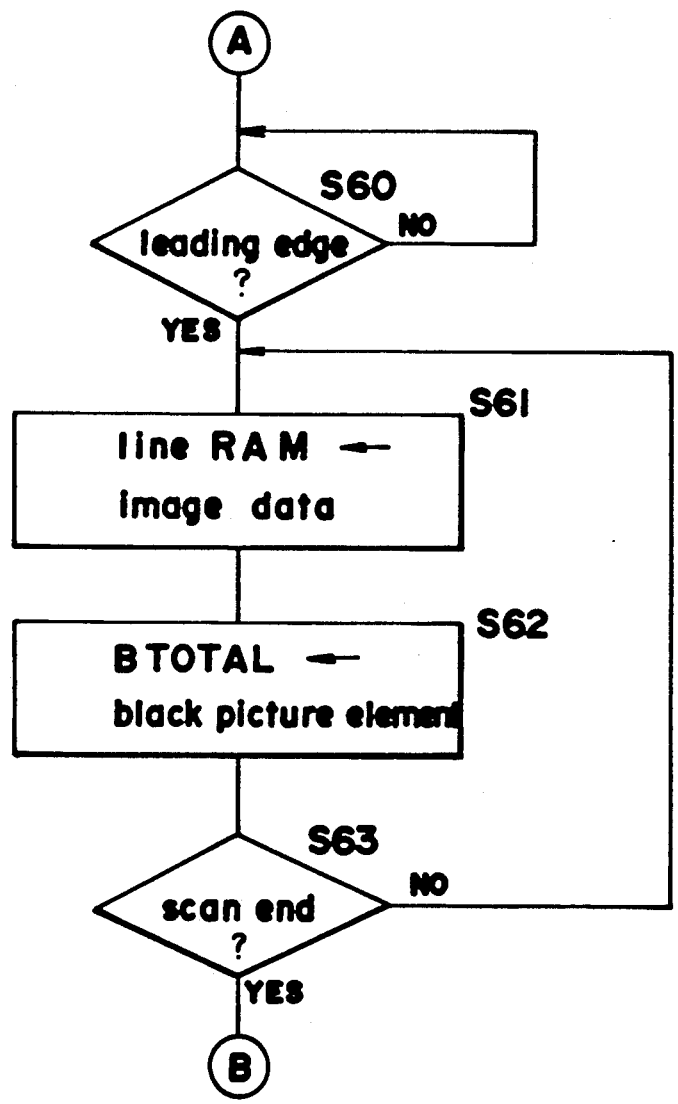
Figure 5C:
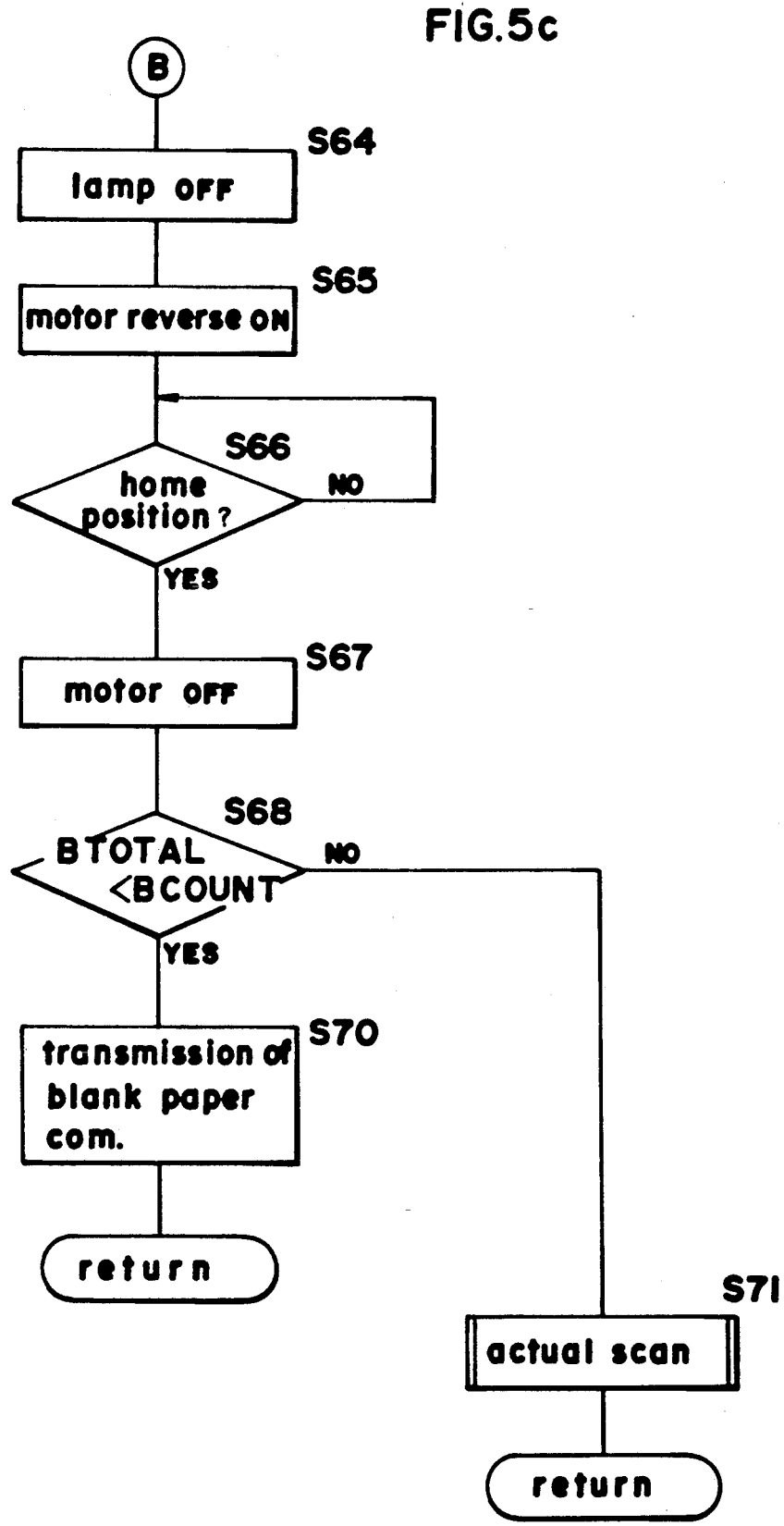

FIGS. 5a to 5c are flow charts showing a subroutine of the prescan for performing a blank document detecting operation. This subroutine is commenced in accordance with a scan command from the host device.

Referring to FIG. 5a, the lamp is at first turned on at step S51, and thereafter, step S52 checks as to whether the scanning system S is in the home position. If it is "Yes" at step S52, the sequence proceeds to step S56. If "No", the motor is rotated for returning the scanning system S back to the home position at step S53. The motor is then deenergized after the scanning system S returns to the home position. Step S56 actuates the motor in order to commence the prescan for detecting the blank document. When the scanning system S moves across the shading correction pattern formed on the reverse face of the document scale 14, the CPU 21 stores the shading data in the line RAM 26 to calculate the shading correction data at step S57. The effective image signal is turned off at the subsequent step S58 for inhibiting the output of the image data since this sequence is the image reading operation by the prescan. Step S59 resets a counter BTOTAL for counting the picture elements determined as black to "0". Subsequently, when step S60 judges that the scanning system S reaches the leading edge of the document, the CPU 21 successively writes the image data read by the image sensor 10 in the line RAM 26 at step S61. Then, the CPU 21 checks the presence of the black level signal for counting the picture elements determined as black, whereupon the counted value is added to the counter BTOTAL at step S62.

The determination of the value of the counter BTOTAL will be explained in detail hereinbelow.

Step S63 checks whether the scanning operation is completed. If it is not completed, the processes at steps S61 to S62 are repeatedly performed. If otherwise, i.e., "Yes" at step S63, the lamp is turned off, the motor is rotated to return the scanning system S to the home position, and the motor is deenergized to terminate the prescan (steps S64 to S67). Step S68 compares the counted value of the picture elements determined as black in the image data with the threshold value BCOUNT of the black picture elements preset for determining the blank document. When the value of BTOTAL is smaller than that of BCOUNT, the CPU 21 judges the document to be blank and delivers the resultant command to the host device at step S70. The host device receiving a blank document detecting command carries out the predetermined procedures for warning the operator that the document is blank, said procedures including the compulsory discharge of the blank document by an automatic document feeder if attached to the image reader, indication by an alarm, display on a CRT display or the like. The determination of step S68 that the value of BTOTAL is greater than that of BCOUNT defines that the document has characters or something like that thereon. Therefore, the sequence proceeds to the subroutine of the image reading operation by the actual scan which is performed at step S71.

Figure 6A:
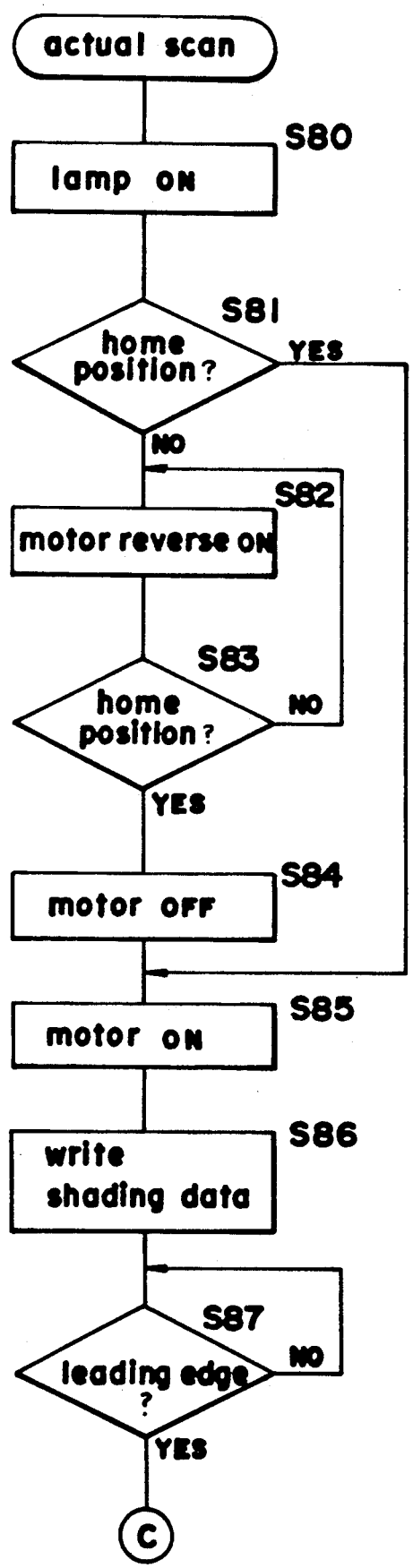
FIGS. 6a and 6b are flow charts showing a subroutine for an image reading operation by an actual scan.
Figure 6B:
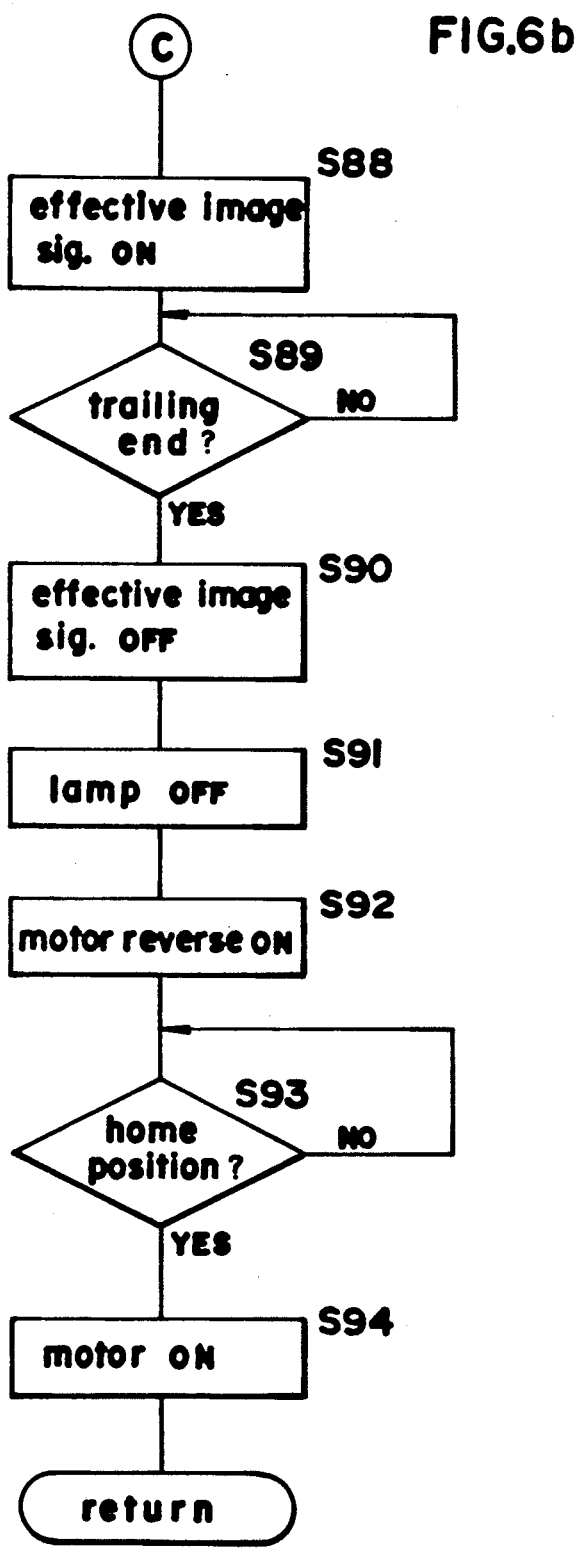

FIG. 6 is a flow chart showing a subroutine of the image reading operation by the actual scan.

After the lamp is turned on at step S80, the scanning system S is confirmed to be in the home position at steps S81 to S84, and then, is moved in the subscanning direction to start the scanning operation at step S85. Thereafter, the shading data is written in the line RAM at step S86 by the same manner as that of the image reading operation by prescan, thereby calculating the shading correction data. When the scanning system S reaches the leading edge of the document ("Yes" at step S87), the effective image signal is turned on at step S88 to deliver the image data to the exterior device. On the other hand, when the scanning system S reaches the trailing edge of the document ("Yes" at step S89), the effective image signal is turned off at step S90, the lamp is turned off at step S91 to return the scanning system S to the home position at steps S92 and S93 and the motor is deenergized at step S94, with the result that the image reading operation is completed.

Explained next is the determination whether the document data has a black level signal.

When the CPU 21 reads the data of a single line (the data of a single main scanning), the image data of each picture element is represent by the value which is classified into $2^n$ (n: bit number of the digital value) from the most white level to the most black level. For example, the data value is classified into 256 stages, i.e., OOH to FFH represented by hexadecimal notation when n is equal to 8.

Figure 7:
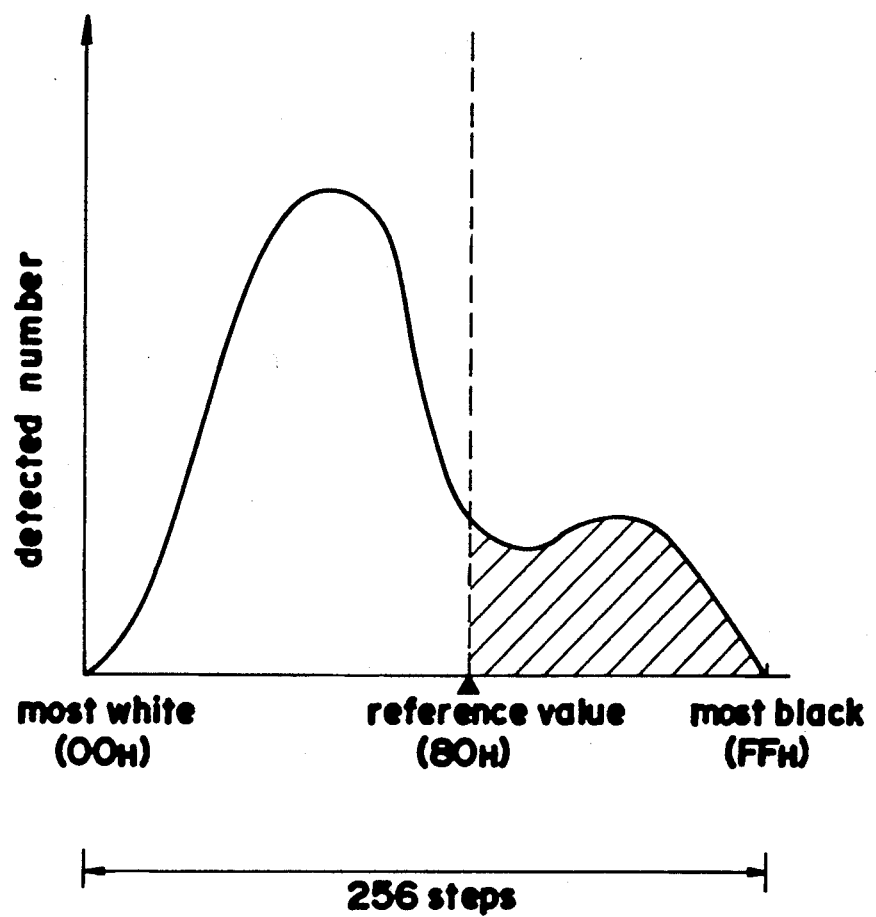
FIG. 7 is a graph showing one example of a density level distribution of a picture element read by the image reader.

FIG. 7 is a graph showing the distribution in which the image data of each picture element is classified into 256 stages which is equal to $2^8$. The detected number of the picture elements is equal to the total number of the picture elements read by the image sensor. In this graph, a reference value, for example, 80H is set, whereby the picture elements of the image data distributed rightward from the reference value are determined to have black level and that distributed leftward to have white level. The picture elements determined to have black level are counted by the counter BTOTAL. The count value of BTOTAL after the completion of the prescan specifies the number of picture elements determined to have black level in the document read by the image sensor. The blank document can be detected as described above by comparing said count value with the preset value of BCOUNT. The BCOUNT value is a threshold value of the number of the black picture elements for determining a blank document.

FIGS. 8a and 8b illustrate the output of the comparator relative to the output of the shading correction circuitry and the result of the determination of the number of the black picture elements. FIG. 8a has a threshold value for binalization of 80H and a reference value for blank paper detection of COH, while FIG. 8b has the same threshold value as that of FIG. 8a and a reference value for blank paper detection of 60H.

According to FIG. 8a, picture elements amounting to 21 has 6 picture elements having an output value from the shading correction circuitry determined as black based on the reference value for blank paper detection in the CPU and has 10 picture elements determined to have the output of "1" from the comparator obtained by the comparison with the threshold value for binalization. In this way, the threshold value for binalization fed to the comparator can be made to differ from the reference value for blank paper detection, the effect of which will be explained in detail with reference to FIG. 8b. FIG. 8b shows the case assuming that the image sensor reads the white document in which the contrast between black and white is not clear. More specifically, FIG. 8b shows the case assuming that the document written with pencil or the like is read. Accordingly, the output from the shading correction circuitry as a whole tends to gather at the side of the level of OOH (white). According to FIG. 8b, 4 picture elements out of 21 deliver the data determined as black to the exterior device from the comparator. However, if the reference value for blank paper detection is set lower than the threshold value for binalization, e.g., 60H, in order to make a sufficient difference between the black portions written with pencil and the background portions, the CPU 21 detects 15 picture elements determined as black out of 21 elements. This detection procedure is successively performed all over the document. When the value of BTOTAL which counts the number of picture elements determined to be black exceeds that of BCOUNT, the image reader judges with the process of CPU that the document has an image thereon such as characters or the like. However, the image reader delivers the data to the exterior device by the actual scan, said data containing many white levels as described above so that the printed matter includes some faint characters. When the printed matter includes some faint characters or whiteouts, the image reader can determine whether the image reading operation is again performed according to the determination result of the output of the comparator and the blank document detecting result. In case where the image reading operation is again executed, the image reader may lower the threshold value for binalization to deliver the clear image data.

Further, the image reader may judge it erroneous image reading if there is a great difference between the BTOTAL value which is the number of the black picture elements determined based on the reference value for blank paper detection and the total number of black picture elements output from the comparator.

As described above, the reference value for blank paper detection is changed depending upon the document state, thereby preventing that the blank document detecting operation is erroneously performed due to the noise such as dusts.

Moreover, the image reader provided with an automatic document feeder in place of the aforesaid document cover may be controlled such that, when the document is judged to be blank, said document is automatically discharged and the copying operation is inhibited even after the automatic document feeder starts its operation.

Although the present invention has been fully described by way of examples with reference to the accompanying the drawings, it is to be noted that various changes and modifications will be apparent to those skilled in the art. Therefore, unless otherwise such changes and modifications depart from the scope of the present invention, they should be construed as being included therein.

What is claimed is:

1. An image reader comprising:
 an image sensor for reading an image of a document and converting the image into electrical bit data;
 scanning optical means for scanning the image of the document and for transmitting the scanned image to the image sensor;
 binarization means for binarizing the bit data by comparing the bit data from the image sensor with a predetermined threshold value;
 blank-judging means for comparing the bit data from the image sensor with a predetermined reference value, the predetermined reference value being set to a value that is different from the predetermined threshold value, and judging that the document is blank when the number of bit data having a value over the predetermined reference value does not exceed a preset number that is not equal to 0; and control means for discontinuing the image reading operation in response to the judgment of a blank document.

2. An image reader as claimed in claim 1, wherein the control means generates a signal representing the existence of a blank document to warn an operator.

3. An image reader as claimed in claim 1, wherein the control means causes the scanning means to preliminary scan the image of the document while inhibiting the output of the read data to the exterior, and then to execute, a scanning operation for outputting the bit data to the exterior when the blank judging means judges that the document is not blank.

4. An image reader comprising:
a document support table for placing a document thereon;
an image sensor reading an image of a document and converting the image into electrical data representative of picture elements;
scanning optical means for scanning the image of the document placed on the document support table and for transmitting the scanned image to the image sensor;
blank document detecting means for detecting whether the document is blank or not, said detection means comparing the data of each picture element with a predetermined reference value, counting a bit number from the data having a value over the predetermined reference value, and detecting whether a blank document is on the support table when the counted number does not exceed a preset number that is not equal to 0; and
control means for preventing a subsequent image reading operation in response to the detection of the blank document.

5. An image reader as claimed in claim 4, wherein the control means generates a signal representing the blank document to warn an operator.

6. An image reader as claimed in claim 4, wherein the control means causes the scanning means to preliminary scan the image of the document wile inhibiting any output of the data to an exterior usage, and then to execute the scanning operation for outputting the bit data to the exterior usage when the blank judging means judges that the document is not blank.

7. An image reader as claimed in claim 4, wherein the blank document detection means includes a memory capable of storing the data for one line, and an analysis means for analyzing the data which can be read out from the memory in succession.

8. An image reader as claimed in claim 4, wherein there is provided on the document support table an automatic document feeder which handles the document so as to position a document on the document support table for reading the image thereof and to discharge the same, and the control means controls the automatic document feeder to discharge the document when the document positioned on the document support table is detected as a blank one.

9. An image reader comprising:
an image sensor means for reading an image of a document and converting the image into electrical bit data representative of individual picture elements;
optical means for projecting the image of the document to the image sensor;
binarization means for binarizing the bit data by comparing the bit data from the image sensor with a predetermined threshold value;
blank-judging means for comparing the bit data of each picture element with a predetermined reference value to detect picture elements indicating black color, the predetermined reference value being set to a value that is different from the predetermined threshold value, and judging that the document is blank when the number of picture elements indicating black color does not exceed a preset number that is not equal to 0; and
control means for discontinuing the image reading operation in response to the judgment of a blank document.

10. An image reader comprising:
an image sensor for reading an image of a document and converting the image into electrical bit data comprised of a plurality of data elements;
scanning optical means for scanning the image of the document and for transmitting the scanned image to the image sensor;
binarization means for binarizing the bit data by comparing the bit data from the image sensor with a predetermined threshold value;
blank-judging means for comparing a value of each of the plurality of data elements with a predetermined reference value to determine the number of data elements having a value greater than the predetermined reference value, the predetermined reference value being set to a value that is different from the predetermined threshold value, and judging that the document is blank when the number of data elements having a value greater than the predetermined reference value does not exceed a preset number; and
control means for discontinuing the image reading operation in response to the judgment of a blank document.

* * * * *